(12) United States Patent
Ogawa

(10) Patent No.: US 8,960,346 B2
(45) Date of Patent: Feb. 24, 2015

(54) BATTERY COOLING STRUCTURE OF HYBRID INDUSTRIAL VEHICLE

(75) Inventor: Kiyomitsu Ogawa, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 647 days.

(21) Appl. No.: 13/056,992

(22) PCT Filed: Aug. 13, 2009

(86) PCT No.: PCT/JP2009/064305
§ 371 (c)(1),
(2), (4) Date: Mar. 7, 2011

(87) PCT Pub. No.: WO2010/021292
PCT Pub. Date: Feb. 25, 2010

(65) Prior Publication Data
US 2011/0147104 A1 Jun. 23, 2011

(30) Foreign Application Priority Data
Aug. 19, 2008 (JP) .................. 2008-210303

(51) Int. Cl.
*B60K 11/06* (2006.01)
*B60K 11/08* (2006.01)
(Continued)

(52) U.S. Cl.
CPC .............. *B60L 11/123* (2013.01); *B60K 1/04* (2013.01); *B60K 11/06* (2013.01); *B60K 11/08* (2013.01);
(Continued)

(58) Field of Classification Search
CPC ........ B60K 11/00; B60K 11/04; B60K 11/08; B60R 16/04
USPC ............... 180/68.1, 68.2, 68.4–68.6
See application file for complete search history.

(56) References Cited

U.S. PATENT DOCUMENTS 4,815,550 A * 3/1989 Mather et al. ............. 180/68.1
4,854,278 A * 8/1989 Honecker ............. 123/198 E
(Continued)

FOREIGN PATENT DOCUMENTS

JP 57-20558 7/1980
JP 56-95927 U 7/1981
(Continued)

OTHER PUBLICATIONS

Japanese Office Action dated Jun. 7, 2011 with English Translation.

*Primary Examiner* — Jeffrey J Restifo
*Assistant Examiner* — Travis Coolman
(74) *Attorney, Agent, or Firm* — Birch, Stewart, Kolasch & Birch, LLP

(57) ABSTRACT

An object of the present invention is to provide a battery cooling structure of a hybrid industrial vehicle such as a hybrid forklift, the battery cooling structure being capable of sufficiently cooling a battery and also of eliminating the possibility that the battery receives heat from its peripheral devices. To achieve the object, a second cooling air flow passage (35) for battery is provided separately from a first cooling air flow passage (31) in which a radiator (32) is disposed. A battery pack 26 or a battery is disposed in the second cooling air flow passage (35). The second cooling air flow passage (35) is connected to the first cooling air flow passage (31) at a position upstream of a cooling fan (33) disposed in the first cooling air flow passage (31), so that the cooling fan (33) sucks cooling air in the first cooling air flow passage (31) and also sucks cooling air in the second cooling air flow passage (35).

20 Claims, 8 Drawing Sheets

(51) Int. Cl.
    *B60K 11/00*     (2006.01)
    *B60L 11/12*     (2006.01)
    *B60K 1/04*     (2006.01)
    *B60L 8/00*     (2006.01)
    *B60L 11/18*     (2006.01)
    *B66F 9/075*     (2006.01)
    *B60K 1/02*     (2006.01)
    *B60K 11/04*     (2006.01)
    *B60K 1/00*     (2006.01)

(52) U.S. Cl.
    CPC ............ *B60L 8/003* (2013.01); *B60L 11/1877* (2013.01); *B66F 9/07531* (2013.01); *B66F 9/07595* (2013.01); *B60K 1/02* (2013.01); *B60K 11/04* (2013.01); *B60K 2001/005* (2013.01); *B60L 2200/42* (2013.01); *B60Y 2200/15* (2013.01); *Y02T 10/6217* (2013.01); *Y02T 10/7005* (2013.01); *Y02T 10/7011* (2013.01); *Y02T 10/705* (2013.01); *Y02T 10/7077* (2013.01); *Y02T 10/7083* (2013.01)
    USPC .......................... 180/68.2; 180/68.1; 180/68.4

(56) References Cited

U.S. PATENT DOCUMENTS

| | | | | |
|---|---|---|---|---|
| 5,215,834 A | * | 6/1993 | Reher et al. .................. | 429/62 |
| 5,320,190 A | * | 6/1994 | Naumann et al. ............ | 180/68.2 |
| 5,392,873 A | * | 2/1995 | Masuyama et al. .......... | 180/68.5 |
| 5,490,572 A | * | 2/1996 | Tajiri et al. .................. | 180/65.1 |
| 5,542,489 A | * | 8/1996 | Allison et al. ............... | 180/68.5 |
| 5,937,664 A | * | 8/1999 | Matsuno et al. ............. | 62/259.2 |
| 6,094,927 A | * | 8/2000 | Anazawa et al. ............. | 62/239 |
| 6,204,769 B1 | * | 3/2001 | Arai et al. .................... | 340/632 |
| 6,394,210 B2 | * | 5/2002 | Matsuda et al. ............. | 180/68.1 |
| 6,750,630 B2 | * | 6/2004 | Inoue et al. .................. | 320/104 |
| 7,025,159 B2 | * | 4/2006 | Smith et al. .................. | 180/68.1 |
| 7,152,417 B2 | * | 12/2006 | Morishita et al. ............ | 62/186 |
| 7,240,752 B2 | * | 7/2007 | Takahashi et al. ........... | 180/68.1 |
| 7,384,704 B2 | * | 6/2008 | Scott ............................. | 429/62 |
| 7,607,501 B2 | * | 10/2009 | Smith et al. .................. | 180/68.1 |
| 7,688,582 B2 | * | 3/2010 | Fukazu et al. ................ | 361/690 |
| 7,728,546 B2 | * | 6/2010 | Tanaka et al. ................ | 320/104 |
| 7,900,727 B2 | * | 3/2011 | Shinmura .................... | 180/68.1 |
| 7,921,946 B2 | * | 4/2011 | Kumar ......................... | 180/65.29 |
| 8,047,318 B2 | * | 11/2011 | Zhu et al. ..................... | 180/68.2 |
| 8,187,736 B2 | * | 5/2012 | Park et al. .................... | 429/62 |
| 8,239,095 B2 | * | 8/2012 | Kikuchi et al. ............... | 701/36 |
| 2002/0170756 A1 | * | 11/2002 | Mehta .......................... | 180/65.2 |
| 2008/0060860 A1 | * | 3/2008 | Murase et al. ................ | 180/65.3 |

FOREIGN PATENT DOCUMENTS

| | | |
|---|---|---|
| JP | 58-101824 A | 6/1983 |
| JP | 4-5122 A | 1/1992 |
| JP | 10-297570 A | 11/1998 |
| JP | 10-309002 A | 11/1998 |
| JP | 2001-85072 A | 3/2001 |
| JP | 2001-231837 A | 8/2001 |
| JP | 2001-291532 A | 10/2001 |
| JP | 2007-32534 A | 2/2007 |
| JP | 2008-63114 A | 3/2008 |

* cited by examiner

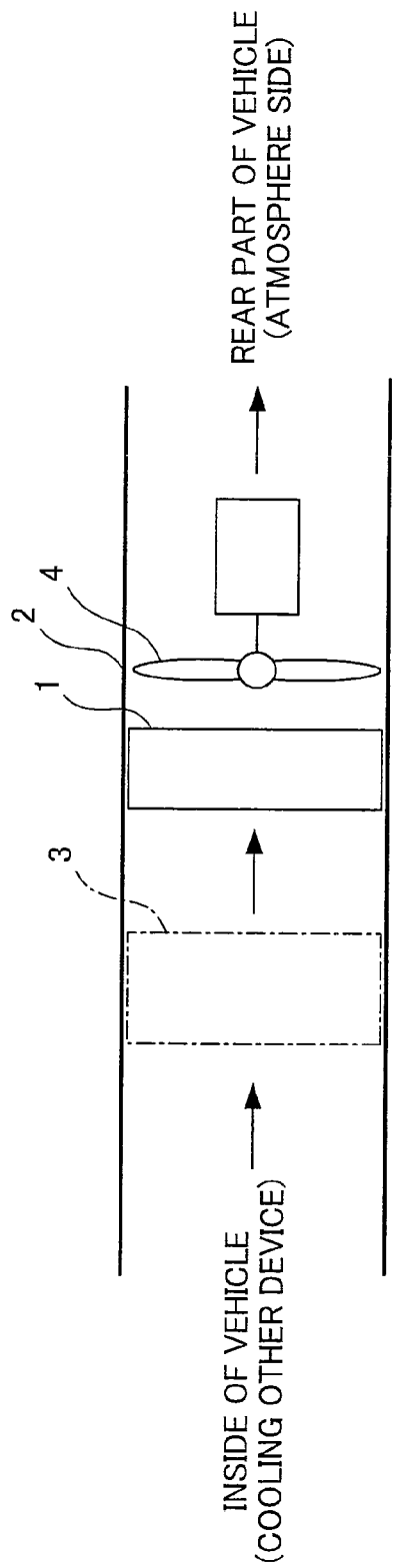

BATTERY COOLING STRUCTURE OF HYBRID INDUSTRIAL VEHICLE

TECHNICAL FIELD

The present invention relates to a battery cooling structure of a hybrid industrial vehicle.

BACKGROUND ART

Hybrid forklifts including an engine and an electric motor as their drive sources and also including a battery or a battery pack to store electric power are excellent in energy efficiency.

In these hybrid forklifts, however, when the electric motor is frequently used, the batteries in the battery pack, such as lithium ion batteries, are frequently charged and discharged. Such frequent charge and discharge causes increase in the amounts of heat generated by the batteries, therefore increasing the temperatures of the batteries. This may possibly lead to the shortening of the batteries' lives. For this reason, in order to maintain the battery performance over a long period of time, the batteries need to be cooled.

One of the simplest configurations to cool the batteries may be a configuration shown in FIG. 9 in which a battery pack 3 is disposed in a cooling air flow passage 2 having a radiator 1 disposed therein to cool engine cooling water with cooling air, so that the batteries in the battery pack 3 are cooled with the cooling air sucked by a cooling fan 4 for the radiator.

PRIOR ART LITERATURE

Patent Literatures

Patent Literature 1: Japanese Patent Application Publication No. Hei 10-309002
Patent Literature 2: Japanese Patent Application Publication No. 2001-231837
Patent Literature 3: Japanese Patent Application Publication No. 2007-032534
Patent Literature 4: Japanese Patent Application Publication No. 2008-063114

SUMMARY OF THE INVENTION

Problems to be Solved by the Invention

However, according to the configuration of the battery cooling structure shown in FIG. 9, the batteries are cooled with cooling air whose temperature has been raised due to the cooling of some other devices such as an engine, and therefore the cooling of the batteries may possibly be insufficient. Moreover, when the battery pack is disposed frontward (upstream) of the radiator as shown in FIG. 9, the batteries inside may possibly receive heat from that other devices instead of being cooled.

Thus, in view of the above circumstances, the present invention has an object to provide a battery cooling structure of a hybrid industrial vehicle such as a hybrid forklift, the battery cooling structure being capable of sufficiently cooling a battery and also of eliminating the possibility that the battery receives heat from its peripheral devices.

Means for Solving the Problems

A battery cooling structure of a hybrid industrial vehicle of a first invention for solving the above problems is a battery cooling structure of a hybrid industrial vehicle including an engine and an electric motor as its drive sources and also including a battery or battery pack to store electric power, the battery cooling structure characterized in that a second cooling air flow passage for battery is provided separately from a first cooling air flow passage in which a radiator to cool engine cooling water with cooling air is disposed, the battery or battery pack is disposed in the second cooling air flow passage, and the second cooling air flow passage is connected to the first cooling air flow passage at a position upstream of a cooling fan disposed in the first cooling air flow passage, so that the cooling fan sucks cooling air in the first cooling air flow passage and also sucks cooling air in the second cooling air flow passage.

A battery cooling structure of the hybrid industrial vehicle of a second invention is the battery cooling structure of the hybrid industrial vehicle of the first invention characterized in that the second cooling air flow passage is connected to the first cooling air flow passage at a position upstream of the radiator, and the cooling fan is disposed upstream or downstream of the radiator.

A battery cooling structure of the hybrid industrial vehicle of a third invention is the battery cooling structure of the hybrid industrial vehicle of the first invention characterized in that the second cooling air flow passage is connected to the first cooling air flow passage at a position downstream of the radiator, and the cooling fan is disposed downstream of the radiator.

A battery cooling structure of the hybrid industrial vehicle of a fourth invention is the battery cooling structure of the hybrid industrial vehicle of any one of the first to third inventions characterized in that the second cooling air flow passage is provided to an upper portion of a rear part of the vehicle and is located above the first cooling air flow passage, and a counterweight provided to the rear part of the vehicle surrounds lateral and rear sides of the battery or battery pack.

A battery cooling structure of the hybrid industrial vehicle of a fifth invention is the battery cooling structure of the hybrid industrial vehicle of the fourth invention characterized in that an upper side of the battery or battery pack is covered with a battery guard.

A battery cooling structure of the hybrid industrial vehicle of a sixth invention is the battery cooling structure of the hybrid industrial vehicle of the fourth invention characterized in that an upper side of the battery or battery pack is covered with a battery cover.

A battery cooling structure of the hybrid industrial vehicle of a seventh invention is the battery cooling structure of the hybrid industrial vehicle of any one of the first to third inventions characterized in that the second cooling air flow passage is inclined with respect to a vertical direction, and the battery or battery pack is disposed to be inclined with respect to the vertical direction.

A battery cooling structure of the hybrid industrial vehicle of an eighth invention is the battery cooling structure of the hybrid industrial vehicle of any one of the first to third inventions characterized in that an air inlet of the second cooling air flow passage is disposed above or at a lateral side of the battery pack, and cooling air having flowed in from the air inlet hits a housing of the battery pack, flows into the housing from one end side of the housing, and then flows out from the other end side of the housing.

A battery cooling structure of the hybrid industrial vehicle of a ninth invention is the battery cooling structure of the hybrid industrial vehicle of any one of the first to third inventions characterized in that a shielding plate is connected to the second cooling air flow passage and extends the second cooling air flow passage to an inside of the first cooling air flow passage.

A battery cooling structure of the hybrid industrial vehicle of a tenth invention is the battery cooling structure of the hybrid industrial vehicle of any one of the first to third inventions characterized in that a cooling fan for battery is provided to the second cooling air flow passage.

A battery cooling structure of the hybrid industrial vehicle of an eleventh invention is the battery cooling structure of the hybrid industrial vehicle of any one of the first to third inventions characterized in that a plurality of batteries in the battery pack are disposed at an upstream side and a downstream side along a flow direction of the cooling air.

A battery cooling structure of the hybrid industrial vehicle of a twelfth invention is the battery cooling structure of the hybrid industrial vehicle of any one of the first to third inventions characterized in that a flapper is provided to the second cooling air flow passage at a position downstream of the battery or battery pack, while the cooling fan is sucking cooling air in the second cooling air flow passage, the flapper is opened, so that the second cooling air flow passage is opened, and while the cooling fan is not sucking cooling air in the second cooling air flow passage, the flapper is closed, so that the second cooling air flow passage is closed.

A battery cooling structure of the hybrid industrial vehicle of a thirteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper hangs down with its own weight and thus closes, so that the second cooling air flow passage is closed.

A battery cooling structure of the hybrid industrial vehicle of a fourteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper is closed by a restoring force derived from elastic deformation of the flapper itself, so that the second cooling air flow passage is closed.

A battery cooling structure of the hybrid industrial vehicle of a fifteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper is closed by a restoring force of an elastic body serving as a holder of the flapper, so that the second cooling air flow passage is closed.

Note that any combination of the configurations of the first to fifteenth inventions above is possible.

Effects of the Invention

The first invention of the battery cooling structure of the hybrid industrial vehicle is the battery cooling structure of the hybrid industrial vehicle including the engine and the electric motor as its drive sources and also including the battery or battery pack to store electric power, the cooling structure characterized in that the second cooling air flow passage for battery is provided separately from the first cooling air flow passage in which the radiator to cool engine cooling water with cooling air is disposed, the battery or battery pack is disposed in the second cooling air flow passage, and the second cooling air flow passage is connected to the first cooling air flow passage at a position upstream of a cooling fan disposed in the first cooling air flow passage, so that the cooling fan sucks cooling air in the first cooling air flow passage and also sucks cooling air in the second cooling air flow passage. Thus, the battery or the batteries in the battery pack can be sufficiently cooled with the cooling air flowing through the second cooling air flow passage.

Additionally, since the battery or battery pack is disposed in the second cooling air flow passage for battery provided separately from the first cooling air flow passage, the battery or battery pack can be prevented from receiving heat from its peripheral devices (an engine and the like) as compared to the case of disposing the battery or battery pack frontward of the radiator like FIG. 9.

Moreover, since the cooling fan is used for both the sucking of the cooling air in the first cooling air flow passage and the sucking of the cooling air in the second cooling air flow passage and these cooling airs share an air outlet, a compact cooling structure can be achieved.

The battery cooling structure of the hybrid industrial vehicle of the second invention is the battery cooling structure of the hybrid industrial vehicle of the first invention characterized in that the second cooling air flow passage is connected to the first cooling air flow passage at a position upstream of the radiator, and the cooling fan is disposed upstream or downstream of the radiator. Thus, advantageous effects similar to those by the first invention can be achieved. In addition, since the second cooling air flow passage is connected at a position upstream of the radiator, there is provided such an advantageous effect that the limited space in the vehicle can be used effectively while still preventing the receiving of heat from other devices such as the engine.

The battery cooling structure of the hybrid industrial vehicle of the third invention is the battery cooling structure of the hybrid industrial vehicle of the first invention characterized in that the second cooling air flow passage is connected to the first cooling air flow passage at a position downstream of the radiator, and the cooling fan is disposed downstream of the radiator. Thus, advantageous effects similar to those by the first invention can be achieved. In addition, since the second cooling air flow passage is connected at a position downstream of the radiator, an uneven flow velocity distribution of the cooling air at the radiator can be suppressed as compared to the case of connecting the second cooling air flow passage at a position upstream of the radiator. Accordingly, deterioration of the cooling performance of the radiator can be prevented.

The battery cooling structure of the hybrid industrial vehicle of the fourth invention is the battery cooling structure of the hybrid industrial vehicle of any one of the first to third inventions characterized in that the second cooling air flow passage is provided to the upper portion of the rear part of the vehicle and is located above the first cooling air flow passage, and the counterweight provided to the rear part of the vehicle surrounds the lateral and rear sides of the battery or battery pack. Thus, the counterweight can protect the battery or battery pack from impact applied from lateral and rear sides (caused by a collision with an external object, or the like).

The battery cooling structure of the hybrid industrial vehicle of the fifth invention is the battery cooling structure of the hybrid industrial vehicle of the fourth invention characterized in that the upper side of the battery or battery pack is covered with the battery guard. Thus, the battery guard can protect the battery or battery pack from impact applied from above (caused by a collision with a falling object, or the like).

The battery cooling structure of the hybrid industrial vehicle of the sixth invention is the battery cooling structure of the hybrid industrial vehicle of the fourth invention characterized in that the upper side of the battery or battery pack is covered with the battery cover. Thus, the battery cover can protect the battery or battery pack from solar radiation.

The battery cooling structure of the hybrid industrial vehicle of the seventh invention is the battery cooling structure of the hybrid industrial vehicle of any one of the first to third inventions characterized in that the second cooling air flow passage is inclined with respect to the vertical direction, and the battery or battery pack is disposed to be inclined with respect to the vertical direction. Thus, even when water enters the second cooling air flow passage, this water is easily drained out of the second cooling air flow passage. Accordingly, it is possible to prevent a situation where water is accumulated in the second cooling air flow passage and the battery or the batteries in the battery pack is or are soaked in the water.

The battery cooling structure of the hybrid industrial vehicle of the eighth invention is the battery cooling structure of the hybrid industrial vehicle of any one of the first to third inventions characterized in that the air inlet of the second cooling air flow passage is disposed above or at the lateral side of the battery pack, and cooling air having flowed in from the air inlet hits the housing of the battery pack, flows into the housing from one end side of the housing, and then flows out from the other end side of the housing. Thus, even if the cooling air contains water, sand, dust and the like, the water, sand, dust and the like are removed to some extent when the cooling air hits the housing of the battery pack. Accordingly, it is possible to reduce the amounts of water, sand, dust and the like entering the battery pack, as compared to a case where the cooling air directly flows into the battery pack from the air inlet.

The battery cooling structure of the hybrid industrial vehicle of the ninth invention is the battery cooling structure of the hybrid industrial vehicle of any one of the first to third inventions characterized in that the shielding plate is connected to the second cooling air flow passage and extends the second cooling air flow passage to the inside of the first cooling air flow passage. Thus, the shielding plate can surely prevent the cooling air whose temperature has been raised due to the cooling of other devices such as the engine, from entering the second cooling air flow passage from the first cooling air flow passage, and also prevent the heat radiated from hot portions of the engine and the like from being transmitted to the batteries.

The battery cooling structure of the hybrid industrial vehicle of the tenth invention is the battery cooling structure of the hybrid industrial vehicle of any one of the first to third inventions characterized in that the cooling fan for battery is provided to the second cooling air flow passage. Thus, the amount of the cooling air flowing into the second cooling air flow passage can be increased so that the battery or the batteries in the battery pack are further cooled. Moreover, it is possible to suppress an uneven flow velocity distribution of the cooling air at the radiator, which would otherwise occur due to unbalanced pressure drops between the first cooling air flow passage side and the second cooling air flow passage side. Accordingly, deterioration of the cooling performance of the radiator can be prevented.

The battery cooling structure of the hybrid industrial vehicle of the eleventh invention is the battery cooling structure of the hybrid industrial vehicle of any one of the first to third inventions characterized in that the plurality of batteries in the battery pack are disposed at an upstream side and a downstream side along the flow direction of the cooling air. Thus, the cooling air at the downstream end of each upstream battery separates from the upstream battery and becomes a turbulent flow. Accordingly, the cooling performance for the downstream battery is improved.

The battery cooling structure of the hybrid industrial vehicle of a twelfth invention is the battery cooling structure of the hybrid industrial vehicle of any one of the first to third inventions characterized in that the flapper is provided to the second cooling air flow passage at a position downstream of the battery or battery pack, while the cooling fan is sucking cooling air in the second cooling air flow passage, the flapper is opened, so that the second cooling air flow passage is opened, and while the cooling fan is not sucking cooling air in the second cooling air flow passage, the flapper is closed, so that the second cooling air flow passage is closed. Thus, hot air from the radiator, which is a heat source located at a downstream side, and from the like can be inhibited by the flapper from flowing back into the second cooling air flow passage and reaching the battery or battery pack while the cooling fan is stopped (while the cooling fan is not sucking the cooling air in the second cooling air flow passage).

The battery cooling structure of the hybrid industrial vehicle of the thirteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper hangs down with its own weight and thus closes, so that the second cooling air flow passage is closed. Thus, hot air from the radiator, which is a heat source located at a downstream side, and from the like can be inhibited from flowing back into the second cooling air flow passage and reaching the battery or battery pack, by using the flapper with such simple configuration without drive means for opening and closing the flapper.

The battery cooling structure of the hybrid industrial vehicle of the fourteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper is closed by a restoring force derived from elastic deformation of the flapper itself, so that the second cooling air flow passage is closed. Thus, hot air from the radiator, which is a heat source located at a downstream side, and from the like can be inhibited from flowing back into the second cooling air flow passage and reaching the battery or battery pack while the cooling fan is stopped, by using the flapper with such simple configuration without drive means for opening and closing the flapper. Moreover, use of the restoring force derived from the elastic deformation of the flapper enables the flapper to be closed more securely than the case where the flapper hangs down with its own weight.

The battery cooling structure of the hybrid industrial vehicle of the fifteenth invention is the battery cooling structure of the hybrid industrial vehicle of the twelfth invention characterized in that while the cooling fan is sucking cooling air in the second cooling air flow passage, the flapper is opened by an air flow caused inside the second cooling air flow passage by the sucking, so that the second cooling air flow passage is opened, and while the cooling fan is not sucking cooling air in the second cooling air flow passage, the flapper is closed by a restoring force of an elastic body serving as a holder of the flapper, so that the second cooling air flow passage is closed. Thus, hot air from the radiator, which is a heat source located at a downstream side, and from the like can be inhibited from flowing back into the second cooling air flow passage and reaching the battery or battery pack while the cooling fan is stopped, by using the flapper with such simple configuration without drive means for opening and closing the flapper. Moreover, use of the restoring force of the flapper holder enables the flapper to be closed more securely than the case where the flapper hangs down with its own weight.

BRIEF DESCRIPTION OF THE DRAWINGS

FIG. 9 is a configuration diagram showing a reference example of the battery cooling structure.

MODES FOR CARRYING OUT THE INVENTION

Hereinbelow, embodiments of the present invention will be described in detail on the basis of the drawings.

Embodiment 1

Figure 1:
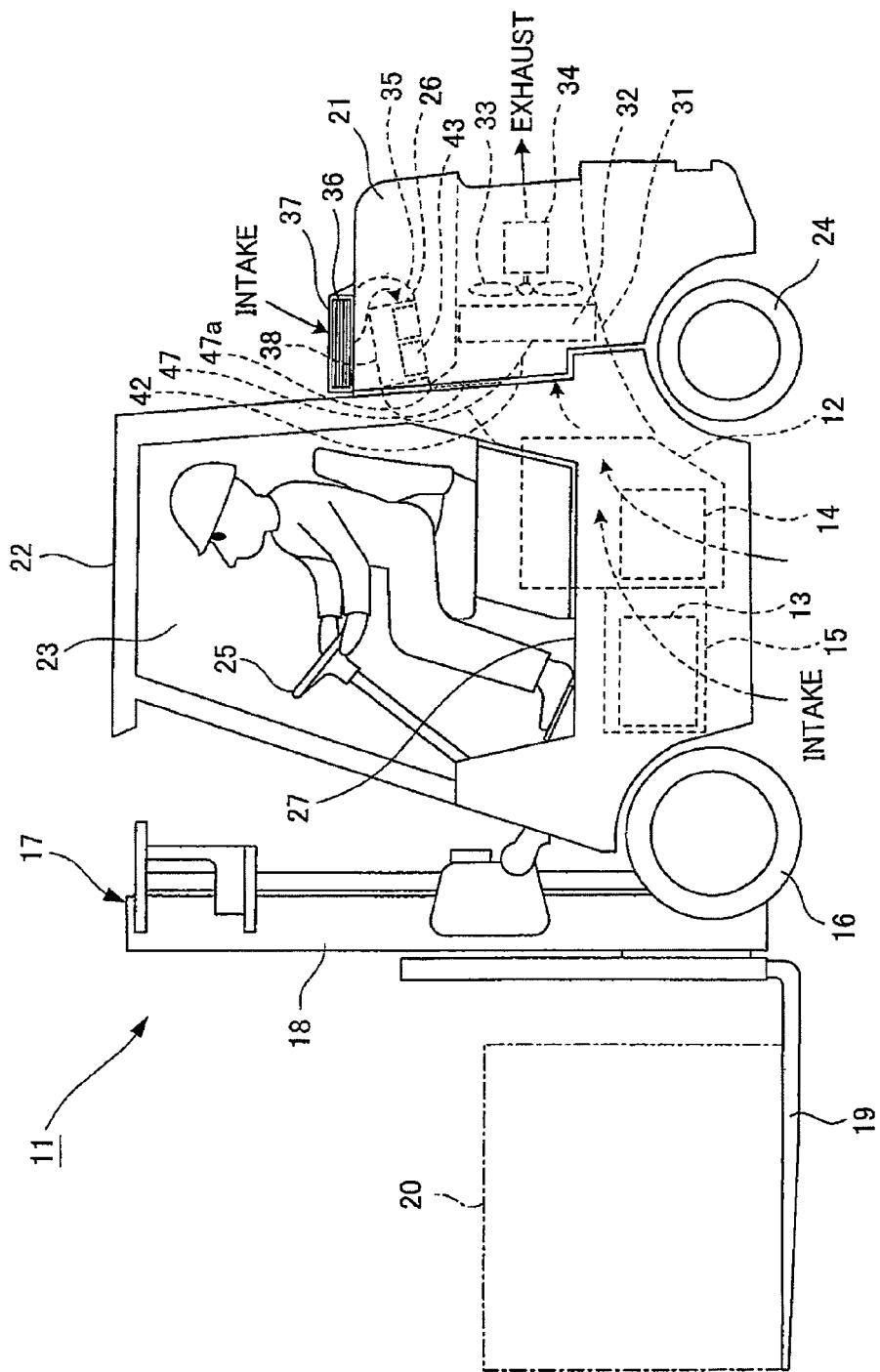
FIG. 1 is a side view of a hybrid forklift including a battery cooling structure according to Embodiment 1 of the present invention.
Figure 2:
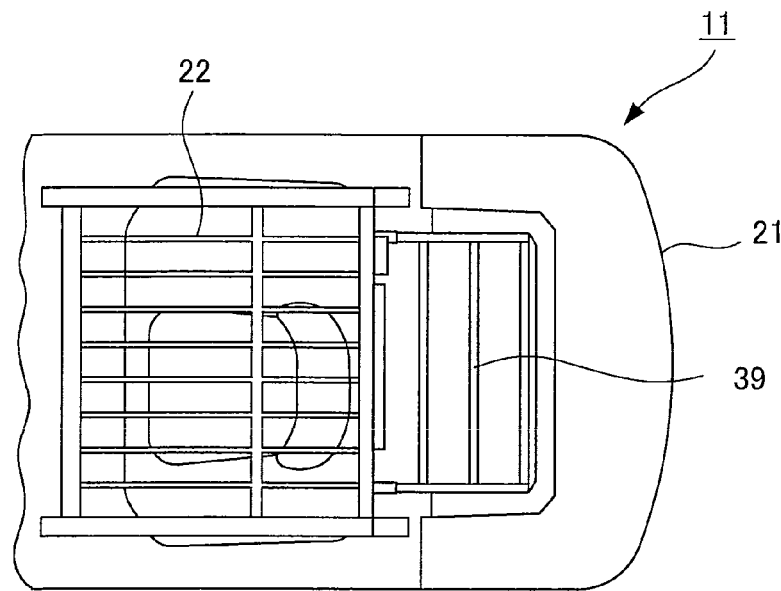
FIG. 2 is a top view of a rear part of the hybrid forklift including the battery cooling structure.
Figure 3:
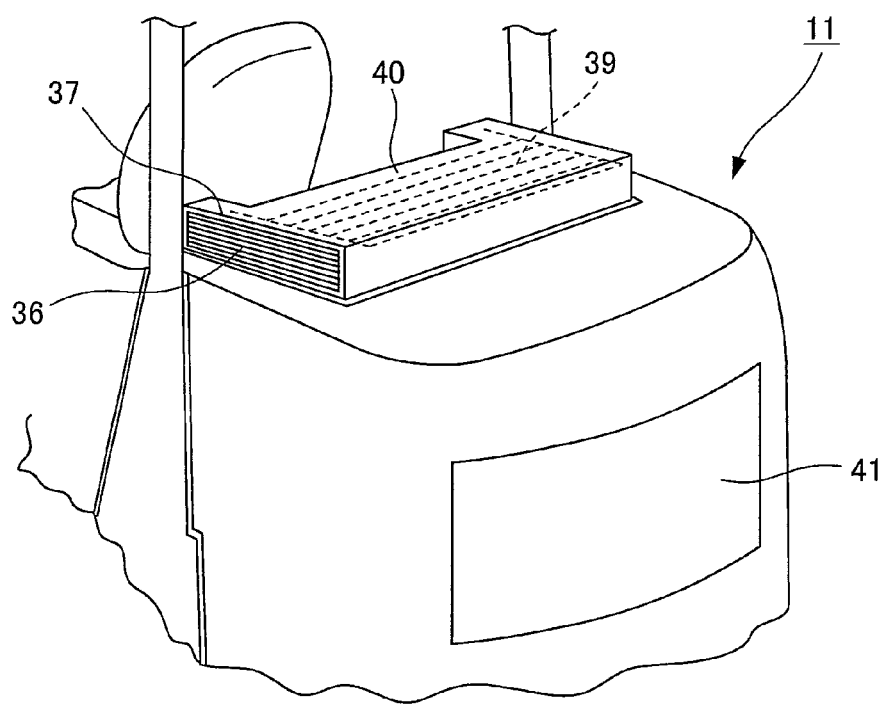
FIG. 3 is a perspective view of the rear part of the hybrid forklift including the battery cooling structure.
Figure 4:
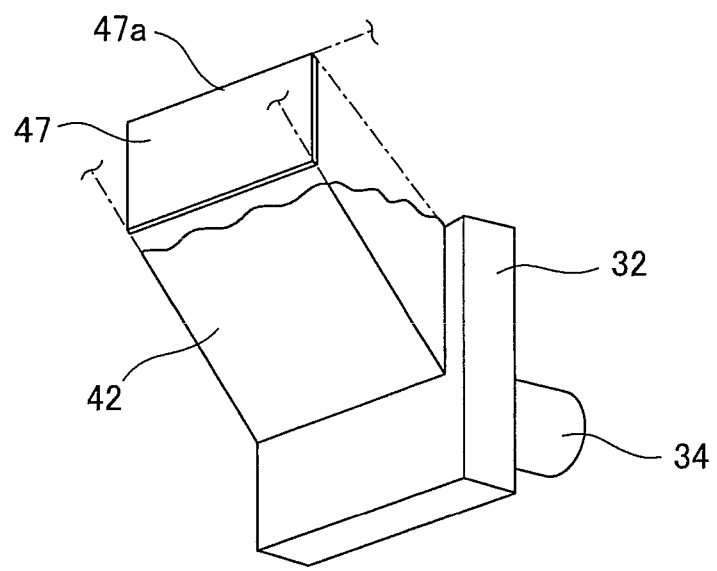
FIG. 4 is a perspective view showing a shielding plate portion taken out from the battery cooling structure.
Figure 5:
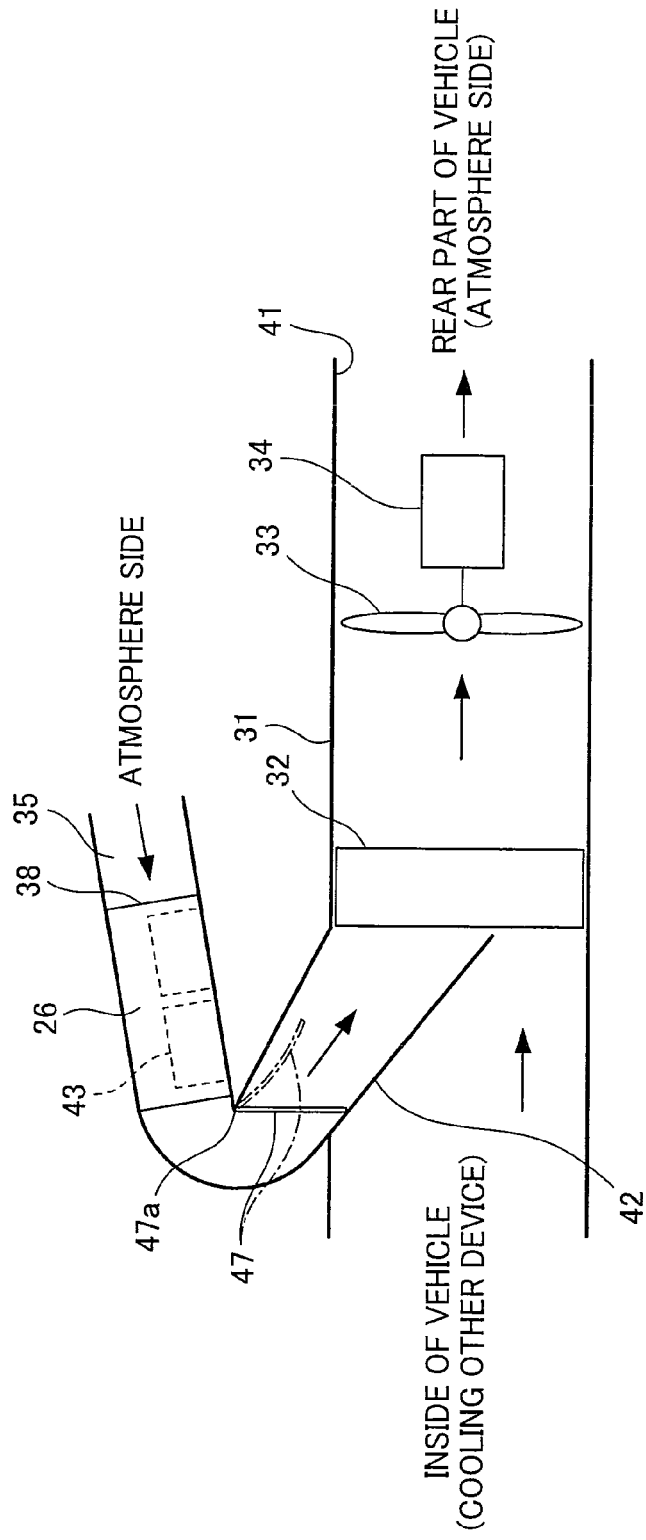
FIG. 5 is a configuration diagram showing a part taken out from the battery cooling structure.

FIG. 1 is a side view of a hybrid forklift including a battery cooling structure according to Embodiment 1 of the present invention. FIG. 2 is a top view of a rear part of the hybrid forklift including the battery cooling structure. FIG. 3 is a perspective view of the rear part of the hybrid forklift including the battery cooling structure. FIG. 4 is a perspective view showing a shielding plate portion taken out from the battery cooling structure. FIG. 5 is a configuration diagram showing a part taken out from the battery cooling structure.

As shown in FIG. 1, a hybrid forklift 11 includes an engine 12 and electric motors 13 and 14 as its drive sources and also includes a battery pack 26 to store electric power. The battery pack 26 includes multiple batteries 43 such as lithium ion batteries housed inside a housing 38.

The power of the engine 12 is transmitted to front wheels 16, which are drive wheels, through a transmission 15. The power of the electric motor 13 is transmitted to the front wheels 16 as well. Moreover, the power of the engine 12 is also transmitted to a cargo-handling device 17, which is provided to a front part of the vehicle, through an unillustrated hydraulic pump. Furthermore, the power of the electric motor 14 is transmitted to the cargo-handling device 17 as well through the hydraulic pump. In the cargo-handling device 17, a cargo 20 loaded on a fork 19 is lifted up and down by a mast 18. There is provided in a rear part of the vehicle a counterweight 21 to prevent the rear part of the vehicle from coming off the ground due to the load applied to the front part (the cargo-handling device 17 side) of the vehicle at the time of cargo handling.

A center part of the vehicle is a cab 23 surrounded by a head guard 22, a floor 27 and the like. This cab 23 is equipped with a steering wheel 25 to steer rear wheels 24, which are steered wheels, as well as a cargo-handling lever and so forth which are not illustrated. Drive systems such as the engine 12 and the electric motors 13 and 14 are disposed below the cab 23.

The battery cooling structure of Embodiment 1 is formed in the rear part of the vehicle. The battery cooling structure will be described below based on FIGS. 1 to 5.

As shown in FIGS. 1 to 5, a radiator 32 and a cooling fan 33 are disposed in a first cooling air flow passage 31. The cooling fan 33 is disposed rearward (downstream) of the radiator 32 and is rotationally driven by an electric motor 34 which operates when supplied with electric power from the battery pack 26.

A second cooling air flow passage 35 for battery is provided separately from the first cooling air flow passage 31. The battery pack 26 is disposed in this second cooling air flow passage 35. The second cooling air flow passage 35 is provided to an upper portion of the rear part of the vehicle and is located above the first cooling air flow passage 31. An air inlet 36 of the second cooling air flow passage 35 is provided to the upper surface of the rear part of the vehicle in a location above the battery pack 26 (or at a lateral side thereof if space allows). Additionally, a louver 37 is attached to the air inlet 36. Accordingly, cooling air having flowed in from the air inlet 36 through the louver 37 hits the housing 38 of the battery pack 26, flows into the housing 38 from one end side (rear end side) of the housing 38, and then flows out from the other end side (front end side) of the housing 38, as indicated by arrows.

The lateral and rear sides of the battery pack 26 are surrounded by the counterweight 21 having a U shape in a top view. This means that the counterweight 21 also has a function of protecting the battery pack 26 from impact applied from lateral and rear sides. In addition, the upper side of the battery pack 26 is covered with a ladder-shaped battery guard 39 and further covered with a battery cover 40 on top of this battery guard 39. The battery guard 39 is made of a metallic material or the like and protects the battery pack 26 from impact applied from above. The battery cover 40 is made of metal or resin such as rubber and protects the battery pack 26 from solar radiation.

Meanwhile, the second cooling air flow passage 35 is inclined with respect to the vertical direction. In the illustrated example, the second cooling air flow passage 35 is so inclined that its front portion (downstream side) is lower than its rear portion (upstream side).

Moreover, the second cooling air flow passage 35 is connected to the first cooling air flow passage 31 at a position frontward (upstream) of the radiator 32. Accordingly, while cooling air having cooled other devices inside the vehicle (i.e., devices other than the batteries, such for example as the engine 12 and the electric motors 13 and 14) is sucked into the first cooling air flow passage 31 by the cooling fan 33, outside air is sucked into the second cooling air flow passage 35 simultaneously. Then, in the first cooling air flow passage 31, the sucked cooling air in the second cooling air flow passage 35 joins the sucked cooling air in the first cooling air flow passage 31. They are then exhausted from their common air outlet 41, which is the rear end (downstream end) of the first cooling air flow passage 31.

In addition, a shielding plate 42 is connected to the second cooling air flow passage 35 and extends the second cooling air flow passage 35 to the inside of the first cooling air flow passage 31 (to the radiator 31 in the illustrated example). Thus, as indicated by arrows, the sucked cooling air in the second cooling air flow passage 35 flows through the inside of the shielding plate 42 and reaches the radiator 32, whereas the sucked cooling air in the first cooling air flow passage 31 flows over the outside of the shielding plate 42 and reaches the radiator 32.

Also, the second cooling air flow passage 35 is provided with a flapper 47 at a position downstream of the battery pack 26. This flapper 47 is a heat-resistant cloth such as a glass cloth, a heat-resistant sheet such as a heat-resistant vinyl sheet, or the like. While the cooling fan 33 is sucking the cooling air in the second cooling air flow passage 35 (i.e., while the cooling fan 33 is operating), the flapper 47 is opened (blown upward) as indicated by a dashed-dotted line in FIG. 5 by an air flow caused inside the second cooling air flow passage 35 by the sucking, so that the second cooling air flow passage 35 is opened.

On the other hand, while the cooling fan 33 is not sucking the cooling air in the second cooling air flow passage 35 (i.e., while the cooling fan 33 is stopped), the flapper 47 hangs down with its own weight and thus closes as indicated by a solid line in FIG. 5, so that the second cooling air flow passage 35 is closed. This occurs when the flapper 47 is a cloth object such a glass cloth.

If the flapper 47 is a heat-resistant vinyl sheet or the like and therefore is elastic, then, while the cooling fan 33 is not sucking the cooling air in the second cooling air flow passage 35 (while the cooling fan 33 is stopped), the flapper 47 is closed (restored) as indicated by the solid line in FIG. 5 by a restoring force derived from the elastic deformation of the flapper 47 (i.e., an elastic reaction force of the flapper 47), so that the second cooling air flow passage 35 is closed.

Incidentally, the flapper 47 itself may be a hard material (e.g., heat-resistant plastic, metal or the like), and a holder 47a of the flapper 47 (i.e., a portion located at an upper end side of the flapper 47 and held by the second cooling air flow passage 35) may be an elastic body (e.g., a thin object of heat-resistant plastic, metal or the like).

In this case, while the cooling fan 33 is sucking the cooling air in the second cooling air flow passage 35 (while the cooling fan 33 is operating), the flapper 47 is opened (blown upward) as indicated by the dashed-dotted line in FIG. 5 by an air flow caused inside the second cooling air flow passage 35 by the sucking, so that the second cooling air flow passage 35 is opened. On the other hand, while the cooling fan 33 is not sucking the cooling air in the second cooling air flow passage 35 (while the cooling fan 33 is stopped), the flapper 47 is closed (restored) as indicated by the solid line in FIG. 5 by a restoring force of the elastic flapper holder 47a (i.e., an elastic reaction force of the elastic flapper holder 47a), so that the second cooling air flow passage 35 is closed.

Note that the cooling fan 33 may be provided frontward (upstream) of the radiator 32 if a certain distance can be secured between the radiator 31 and the connecting portion of the first cooling air flow passage 31 and the second cooling air flow passage 35. Even in this case, the cooling fan 33 can suck the cooling air in the first cooling air flow passage 31 and the cooling air in the second cooling air flow passage 35 at the same time.

As described above, the battery cooling structure of Embodiment 1 is characterized in that: the second cooling air flow passage 35 for battery is provided separately from the first cooling air flow passage 31 in which the radiator 32 to cool engine cooling water with cooling air is disposed; the battery pack 26 is disposed in the second cooling air flow passage 35; and the second cooling air flow passage 35 is connected to the first cooling air flow passage 31 at a position upstream of the cooling fan 33 disposed in the first cooling air flow passage 31, so that the cooling fan 33 sucks cooling air in the first cooling air flow passage 31 and also sucks cooling air in the second cooling air flow passage 35. Thus, the batteries 43 in the battery pack 26 can be sufficiently cooled with the cooling air flowing through the second cooling air flow passage.

Additionally, since the battery pack 26 is disposed in the second cooling air flow passage 35 for battery provided separately from the first cooling air flow passage 31, the battery pack 26 can be prevented from receiving heat from its peripheral devices (the engine 12 and the like) as compared to the case of disposing the battery pack 26 frontward of the radiator like FIG. 9.

Moreover, since the cooling fan 33 is used for both the sucking of the cooling air in the first cooling air flow passage 31 and the sucking of the cooling air in the second cooling air flow passage 35 and these cooling airs share the air outlet 41, a compact cooling structure can be achieved.

Furthermore, since the second cooling air flow passage 35 is connected at a position upstream of the radiator 32, there is provided such an advantageous effect that the limited space in the vehicle can be used effectively while still preventing the receiving of heat from other devices such as the engine 12.

The battery cooling structure of Embodiment 1 is also characterized in that the shielding plate 42 is connected to the second cooling air flow passage 35 and extends the second cooling air flow passage 35 to the inside of the first cooling air flow passage 31. Thus, the shielding plate 42 can surely prevent the cooling air whose temperature has been raised due to the cooling of other devices such as the engine 12, from entering the second cooling air flow passage 35 from the first cooling air flow passage 31, and also prevent the heat radiated from hot portions of the engine 12 and the like from being transmitted to the batteries.

The battery cooling structure of Embodiment 1 is also characterized in that the second cooling air flow passage 35 is provided to an upper portion of the rear part of the vehicle and is located above the first cooling air flow passage 31, and the counterweight 21 provided to the rear part of the vehicle surrounds lateral and rear sides of the battery pack 26. Thus, the counterweight 21 can protect the battery pack 26 from impact applied from lateral and rear sides (caused by a collision with an external object, or the like).

The battery cooling structure of Embodiment 1 is also characterized in that an upper side of the battery pack 26 is covered with the battery guard 39. Thus, the battery guard 39 can protect the battery pack 26 from impact applied from above (caused by a collision with a falling object, or the like).

The battery cooling structure of Embodiment 1 is also characterized in that an upper side of the battery pack 26 is covered with the battery cover 40. Thus, the battery cover 40 can protect the battery pack 26 from solar radiation.

The battery cooling structure of Embodiment 1 is also characterized in that the second cooling air flow passage 35 is inclined with respect to the vertical direction, and the battery pack 26 is disposed to be inclined with respect to the vertical direction. Thus, even when water enters the second cooling air flow passage 35, this water is easily drained out of the second cooling air flow passage 35. Accordingly, it is possible to prevent a situation where water is accumulated in the second cooling air flow passage 35 and the batteries 43 in the battery pack 26 are soaked in the water.

The battery cooling structure of Embodiment 1 is also characterized in that the air inlet 36 of the second cooling air flow passage is disposed above (or at a lateral side of) the battery pack 26, and the cooling air having flowed in from the air inlet 36 hits the housing 38 of the battery pack 26, flows into the housing 38 from one end side of the housing 38, and then flows out from the other end side of the housing 38. Thus, even if the cooling air contains water, sand, dust and the like, the water, sand, dust and the like are removed to some extent when the cooling air hits the housing 38 of the battery pack 26. Accordingly, it is possible to reduce the amounts of water, sand, dust and the like entering the battery pack 26, as compared to a case where the cooling air directly flows into the battery pack 26 from the air inlet.

The battery cooling structure of Embodiment 1 is also characterized that: the flapper 47 is provided to the second cooling air flow passage 35 at a position downstream of the battery pack 26; while the cooling fan 33 is sucking the cooling air in the second cooling air flow passage 35, the flapper 47 is opened, so that the second cooling air flow passage 35 is opened; and while the cooling fan 33 is not sucking the cooling air in the second cooling air flow passage 35, the flapper 47 is closed, so that the second cooling air flow passage 35 is closed. Thus, hot air from the radiator 32, which is a heat source located at a downstream side, and from the like can be inhibited by the flapper 47 from flowing back into the second cooling air flow passage 35 and reaching the battery pack 26 while the cooling fan 33 is stopped (while the cooling fan 33 is not sucking the cooling air in the second cooling air flow passage 35).

Moreover, the battery cooling structure of Embodiment 1 is characterized that, if the flapper 47 is a cloth object such as a heat-resistant cloth: while the cooling fan 33 is sucking the cooling air in the second cooling air flow passage 35, the flapper 47 is opened by an air flow caused inside the second cooling air flow passage 35 by the sucking, so that the second cooling air flow passage 35 is opened; and while the cooling fan 33 is not sucking the cooling air in the second cooling air flow passage 35, the flapper 47 hangs down with its own weight and thus closes, so that the second cooling air flow passage 35 is closed. Thus, hot air from the radiator 32, which is a heat source located at a downstream side, and from the like can be inhibited from flowing back into the second cooling air flow passage 35 and reaching the battery pack 26 while the cooling fan 33 is stopped, by using the flapper 47 with such simple configuration without drive means for opening and closing the flapper.

Meanwhile, the battery cooling structure of Embodiment 1 is characterized that, if the flapper 47 is a heat-resistant vinyl sheet or the like and therefore is elastic: while the cooling fan 33 is sucking the cooling air in the second cooling air flow passage 35, the flapper 47 is opened by an air flow caused inside the second cooling air flow passage 35 by the sucking, so that the second cooling air flow passage 35 is opened; and while the cooling fan 33 is not sucking the cooling air in the second cooling air flow passage 35, the flapper 47 is closed by a restoring force derived from the elastic deformation of the flapper 47, so that the second cooling air flow passage 35 is closed. Thus, hot air from the radiator 32, which is a heat source located at a downstream side, and from the like can be inhibited from flowing back into the second cooling air flow passage 35 and reaching the battery pack 26 while the cooling fan 33 is stopped, by using the flapper 47 with such simple configuration without drive means for opening and closing the flapper. Moreover, use of the restoring force derived from the elastic deformation of the flapper 47 enables the flapper 47 to be closed more securely than the case where the flapper 47 hangs down with its own weight.

The battery cooling structure of Embodiment 1 is also characterized that, if the flapper 47 itself is a hard material and the flapper holder 47a is an elastic body: while the cooling fan 33 is sucking the cooling air in the second cooling air flow passage 35, the flapper 47 is opened by an air flow caused inside the second cooling air flow passage 35 by the sucking, so that the second cooling air flow passage 35 is opened; and while the cooling fan 33 is not sucking the cooling air in the second cooling air flow passage 35, the flapper 47 is closed by a restoring force of the elastic body serving as the flapper holder 47a, so that the second cooling air flow passage 35 is closed. Thus, hot air from the radiator 32, which is a heat source located at a downstream side, and from the like can be inhibited from flowing back into the second cooling air flow passage 35 and reaching the battery pack 26 while the cooling fan 33 is stopped, by using the flapper 47 with such simple configuration without drive means for opening and closing the flapper. Moreover, use of the restoring force of the elastic flapper holder 47a enables the flapper 47 to be closed more securely than the case where the flapper 47 hangs down with its own weight.

Note that the present invention is not necessarily limited to these. It is possible to employ a configuration in which the flapper is opened and closed by drive means for opening and closing, such as a motor. In this case, while the cooling fan 33 is sucking the cooling air in the second cooling airflow passage 35, the flapper is opened by the drive means for opening and closing, so that the second cooling air flow passage 35 is opened. While the cooling fan 33 is not sucking the cooling air in the second cooling air flow passage 35, the flapper is closed by the drive means for opening and closing, so that the second cooling air flow passage 35 is closed.

Embodiment 2

Figure 6:
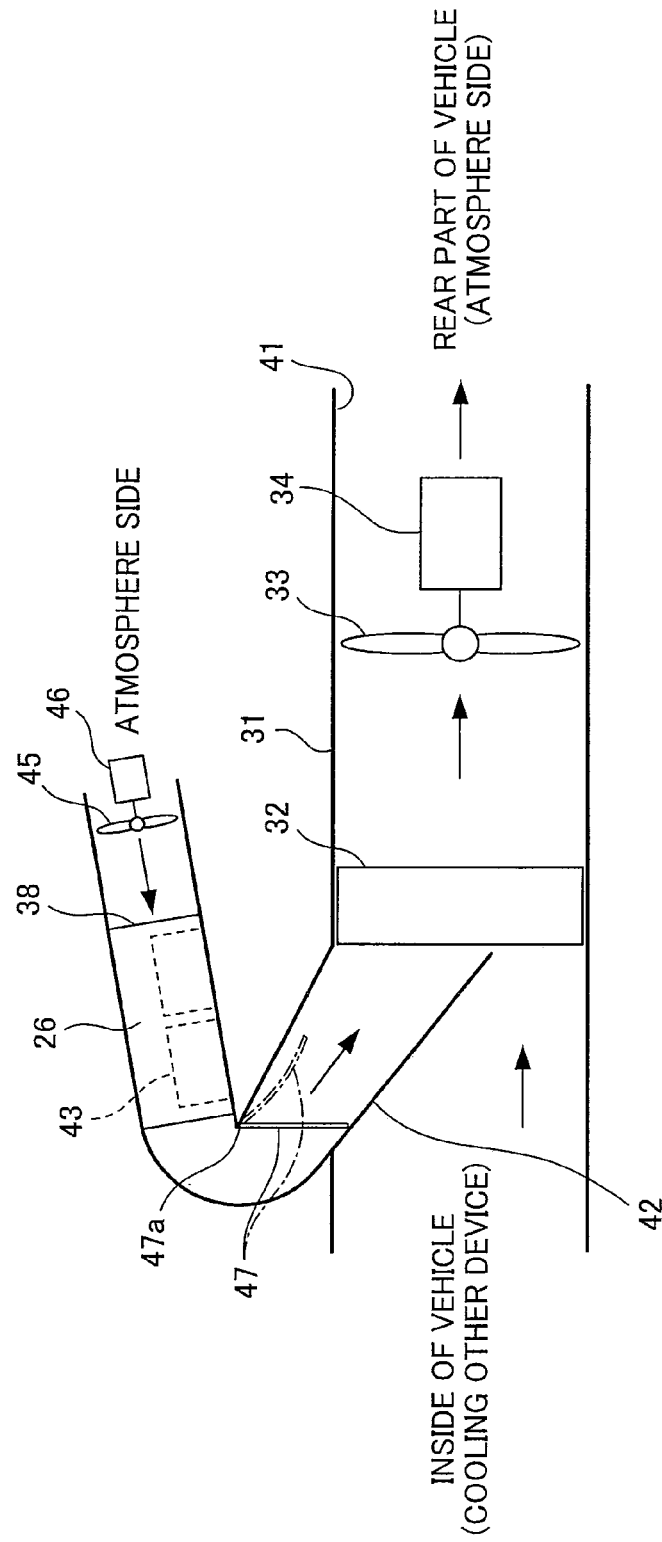
FIG. 6 is a configuration diagram of a battery cooling structure of a hybrid forklift according to Embodiment 2 of the present invention.

FIG. 6 is a configuration diagram of a battery cooling structure of a hybrid forklift according to Embodiment 2 of the present invention. Note that the general configuration of the hybrid forklift and the general configuration of the battery cooling structure are similar to those in Embodiment 1 described above (see FIGS. 1 to 5), and their illustration and description will be omitted herein. In addition, in FIG. 6, similar components to those in FIG. 5 are denoted by the same reference numerals, and their overlapping description will be omitted.

As shown in FIG. 6, in the battery cooling structure of Embodiment 2, a cooling fan 45 for battery is provided to the second cooling air flow passage 35. The cooling fan 45 is disposed rearward (upstream) of the battery pack 26 and is rotationally driven by an electric motor 46 which operates when supplied with electric power from the battery pack 26. Note that the cooling fan 45 may be provided frontward (downstream) of the battery pack 26.

As described above, the battery cooling structure of Embodiment 2 is characterized in that the cooling fan 45 for battery is provided to the second cooling air flow passage 35. Thus, the amount of cooling air flowing into the second cooling air flow passage 35 can be increased so that the batteries 43 in the battery pack 26 are further cooled. Moreover, it is possible to suppress an uneven flow velocity distribution of the cooling air at the radiator 32, which would otherwise occur due to unbalanced pressure drops between the first cooling air flow passage 31 side and the second cooling air flow passage side. Accordingly, deterioration of the cooling performance of the radiator 32 can be prevented.

Embodiment 3

Figure 7:
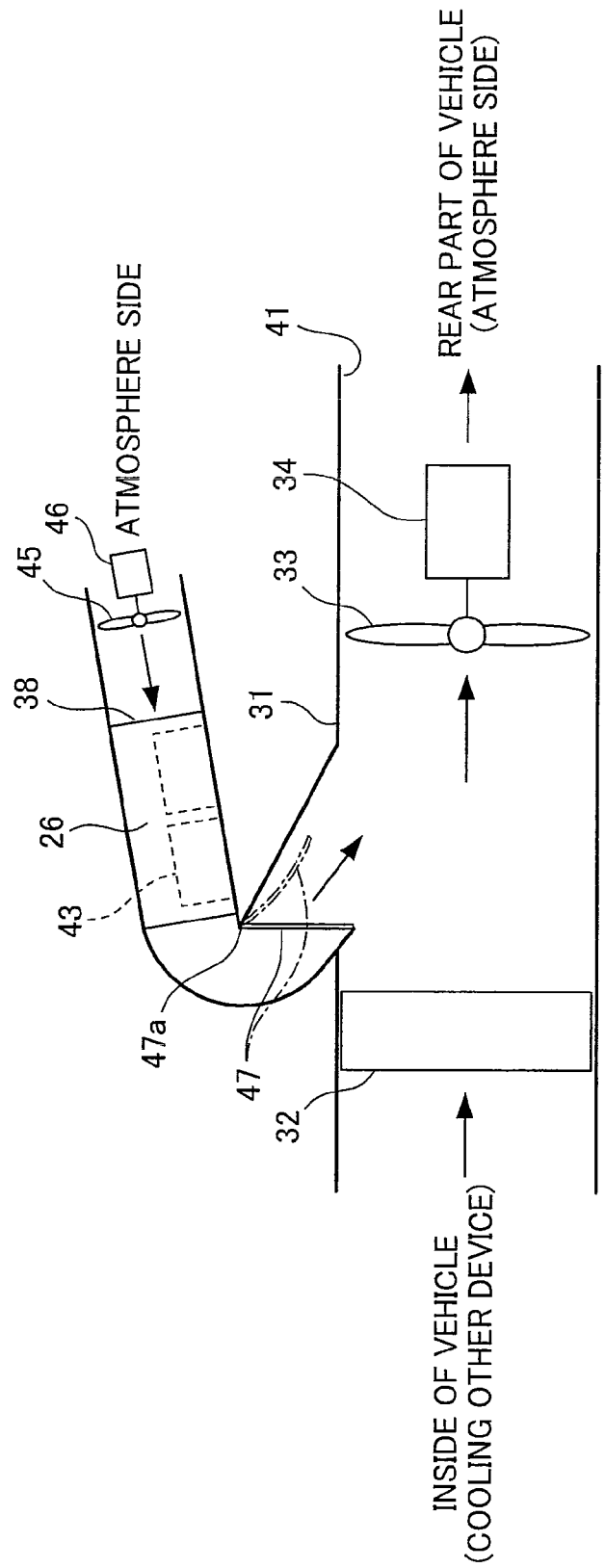
FIG. 7 is a configuration diagram of a battery cooling structure of a hybrid forklift according to Embodiment 3 of the present invention.

FIG. 7 is a configuration diagram of a battery cooling structure of a hybrid forklift according to Embodiment 3 of the present invention. Note that the general configuration of the hybrid forklift and the general configuration of the battery cooling structure are similar to those in Embodiment 1 described above (see FIGS. 1 to 5), and their illustration and description will be omitted herein. In addition, in FIG. 7, similar components to those in FIG. 5 are denoted by the same reference numerals, and their overlapping description will be omitted.

As shown in FIG. 7, in the battery cooling structure of Embodiment 3, the second cooling air flow passage 35 is connected to the first cooling air flow passage 31 at a position rearward (downstream) of the radiator 32. Accordingly, while cooling air having cooled other devices inside the vehicle (i.e., devices other than the batteries, such for example as the engine 12 and the electric motors 13 and 14) is sucked into the first cooling air flow passage 31 by the cooling fan 33, outside air is sucked into the second cooling air flow passage 35 simultaneously. Then, in the first cooling air flow passage 31, the sucked cooling air in the second cooling air flow passage 35 joins the sucked cooling air in the first cooling air flow passage 31. They are then exhausted from their common air outlet 41, which is the rear end (downstream end) of the first cooling air flow passage 31.

In addition, the cooling fan 45 for battery is provided to the second cooling air flow passage 35. The cooling fan 45 is disposed rearward (upstream) of the battery pack 26 and is rotationally driven by the electric motor 46 which operates when supplied with electric power from the battery pack 26. Note that the present invention is not necessarily limited to this. The cooling fan 45 may be provided frontward (downstream) of the battery pack 26 or may not be provided.

As described above, like Embodiment 1 described above, the battery cooling structure of Embodiment 3 is characterized in that: the second cooling air flow passage 35 for battery is provided separately from the first cooling air flow passage 31 in which the radiator 32 to cool engine cooling water with cooling air is disposed; and the second cooling air flow passage 35 is connected to the first cooling air flow passage 31 at a position upstream of the cooling fan 33 disposed in the first cooling air flow passage 31, so that the cooling fan 33 sucks cooling air in the first cooling air flow passage 31 and also sucks cooling air in the second cooling air flow passage 35. Thus, the batteries 43 in the battery pack 26 can be sufficiently cooled with the cooling air flowing through the second cooling air flow passage.

Additionally, since the battery pack 26 is disposed in the second cooling air flow passage 35 for battery provided separately from the first cooling air flow passage 31, the battery pack 26 can be prevented from receiving heat from peripheral devices (the engine 12 and the like) as compared to the case of disposing the battery pack 26 on the front side of the radiator like FIG. 9.

Furthermore, since the cooling fan 33 is used for both the sucking of the cooling air in the first cooling air flow passage 31 and the sucking of the cooling air in the second cooling air flow passage 35 and these cooling airs share the air outlet, a compact cooling structure can be achieved.

Moreover, since the second cooling air flow passage 35 is connected at a position downstream of the radiator 32, an uneven flow velocity distribution of the cooling air at the radiator 32 can be suppressed as compared to the case of connecting the second cooling air flow passage 35 at a position upstream of the radiator 32. Accordingly, deterioration of the cooling performance of the radiator 32 can be prevented.

Embodiment 4

Figure 8:
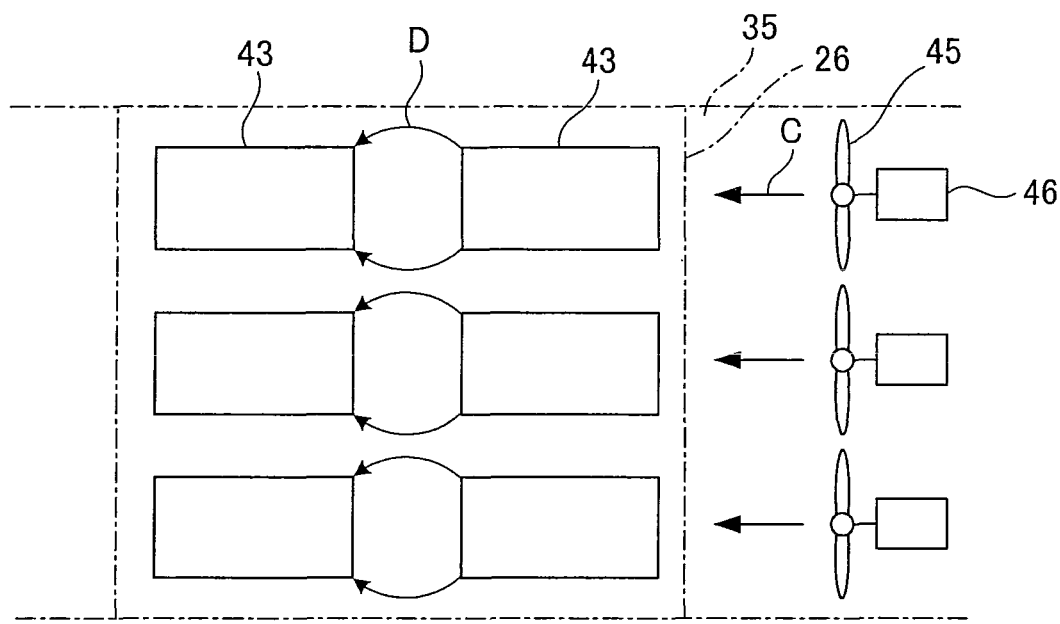
FIG. 8 is a configuration diagram of a main part of a battery cooling structure of a hybrid forklift according to Embodiment 4 of the present invention.

FIG. 8 is a configuration diagram of a main part of a battery cooling structure of a hybrid forklift according to Embodiment 4 of the present invention. Note that the general configuration of the hybrid forklift and the general configuration of the battery cooling structure are similar to those in any of Embodiments 1 to 3 described above (see FIGS. 1 to 7), and their illustration and description will be omitted herein.

As shown in FIG. 8, in the battery cooling structure of Embodiment 4, the multiple batteries 43 in the battery pack 26 are arranged in three rows. In each row, paired batteries 43 are disposed respectively at an upstream side and a downstream side along the flow direction of the cooling air indicated by an arrow C.

Note that the cooling fan 45 for battery is provided for each row of the batteries 43 in the illustrated example; however, the present invention is not limited to this. Only one cooling fan 45 may be provided or may not be provided.

As described above, the battery cooling structure of Embodiment 4 is characterized in that the multiple batteries 43 in the battery pack 26 are disposed at an upstream side and a downstream side along the flow direction of the cooling air. Thus, the cooling air at the downstream end of each upstream battery separates from the upstream battery 43 and becomes a turbulent flow as indicated by an arrow D in FIG. 10. Accordingly, the cooling performance for the downstream battery 43 is improved.

Hereinabove, description has been given of cases of cooling a battery pack (i.e., multiple batteries inside a battery pack). Note, however, that the present invention is not limited to these. The battery cooling structure of the present invention is applicable to cases of cooling a single battery.

Also hereinabove, description has been given of battery cooling structures of a hybrid forklift. However, the present invention is not limit to these. The battery cooling structure of the present invention is applicable to battery cooling structures of hybrid industrial vehicles other than hybrid forklifts.

INDUSTRIAL APPLICABILITY

The present invention relates to a battery cooling structure of a hybrid industrial vehicle and is useful when applied to battery cooling structures of, for example, hybrid forklifts.

EXPLANATION OF REFERENCE NUMERALS 11 hybrid forklift, 12 engine, 13, 14 electric motor, 15 transmission, 16 front wheel, 17 cargo-handling device, 18 mast, 19 fork, 20 cargo, 21 counterweight, 22 head guard, 23 cab, 24 rear wheel, 25 steering wheel, 26 battery pack, 27 floor, 31 first cooling air flow passage, 32 radiator, 33 cooling fan, 34 electric motor, 35 second cooling air flow passage, 36 air inlet, 37 louver, 38 housing, 39 battery guard, 40 battery cover, 41 air outlet, 42 shielding plate, 43 battery, 45 cooling fan, 46 electric motor, 47 flapper, 47a flapper holder

The invention claimed is:

1. A battery cooling structure of a hybrid industrial vehicle including an engine and an electric motor as its drive sources and also including a battery or a battery pack to store electric power, the battery cooling structure comprising:
a first cooling air flow passage through which cooling air having cooled the engine and the electric motor flows and in which a radiator and a cooling fan to cool engine cooling water with the cooling air are disposed;
a second cooling air flow passage for the battery or the battery pack is provided separately from the first cooling air flow passage, wherein
the battery or the battery pack is disposed in the second cooling air flow passage,
the second cooling air flow passage is coupled to the first cooling air flow passage at a position upstream of the cooling fan disposed in the first cooling air flow passage, so that the cooling fan sucks cooling air in the first cooling air flow passage and also sucks cooling air in the second cooling air flow passage, and the cooling fan discharges the cooling air sucked into the first cooling air flow passage and the cooling air sucked into the second cooling air flow passage, through an air outlet of the first cooling air flow passage, and
the first cooling air flow passage, the engine and the electric motor are disposed upstream of the radiator and the cooling fan in the flow direction of the cooling air.

2. The battery cooling structure of the hybrid industrial vehicle according to claim 1, wherein
the second cooling air flow passage is connected to the first cooling air flow passage at a position upstream of the radiator, and
the cooling fan is disposed upstream or downstream of the radiator.

3. The battery cooling structure of the hybrid industrial vehicle according to claim 2, wherein
the second cooling air flow passage is provided to an upper portion of a rear part of the vehicle and is located above the first cooling air flow passage, and
a counterweight provided to the rear part of the vehicle surrounds lateral and rear sides of the battery or the battery pack.

4. The battery cooling structure of the hybrid industrial vehicle according to claim 2, wherein
the second cooling air flow passage is inclined with respect to a vertical direction, and
the battery or the battery pack is disposed to be inclined with respect to the vertical direction.

5. The battery cooling structure of the hybrid industrial vehicle according to claim 2, wherein
an air inlet of the second cooling air flow passage is disposed above or at a lateral side of the battery pack, and
cooling air having flowed in from the air inlet hits a housing of the battery pack, flows into the housing from one end side of the housing, and then flows out from the other end side of the housing.

6. The battery cooling structure of the hybrid industrial vehicle according to claim 1, wherein
a flapper is provided to the second cooling air flow passage at a position downstream of the battery or the battery pack,
while the cooling fan is sucking cooling air in the second cooling air flow passage, the flapper is opened, so that the second cooling air flow passage is opened, and
while the cooling fan is not sucking cooling air in the second cooling air flow passage, the flapper is closed, so that the second cooling air flow passage is closed.

7. The battery cooling structure of the hybrid industrial vehicle according to claim 6, wherein
while the cooling fan is sucking cooling air in the second cooling air flow passage, the flapper is opened by an air flow caused inside the second cooling air flow passage by the sucking, so that the second cooling air flow passage is opened, and
while the cooling fan is not sucking cooling air in the second cooling air flow passage, the flapper hangs down with its own weight and thus closes, so that the second cooling air flow passage is closed.

8. The battery cooling structure of the hybrid industrial vehicle according to claim 6, wherein
while the cooling fan is sucking cooling air in the second cooling air flow passage, the flapper is opened by an air flow caused inside the second cooling air flow passage by the sucking, so that the second cooling air flow passage is opened, and
while the cooling fan is not sucking cooling air in the second cooling air flow passage, the flapper is closed by a restoring force derived from elastic deformation of the flapper itself, so that the second cooling air flow passage is closed.

9. The battery cooling structure of the hybrid industrial vehicle according to claim 6, wherein
while the cooling fan is sucking cooling air in the second cooling air flow passage, the flapper is opened by an air flow caused inside the second cooling air flow passage by the sucking, so that the second cooling air flow passage is opened, and
while the cooling fan is not sucking cooling air in the second cooling air flow passage, the flapper is closed by a restoring force of an elastic body serving as a holder of the flapper, so that the second cooling air flow passage is closed.

10. The battery cooling structure of the hybrid industrial vehicle according to claim 1, wherein
the second cooling air flow passage is connected to the first cooling air flow passage at a position downstream of the radiator, and
the cooling fan is disposed downstream of the radiator.

11. The battery cooling structure of the hybrid industrial vehicle according to claim 10, wherein
the second cooling air flow passage is provided to an upper portion of a rear part of the vehicle and is located above the first cooling air flow passage, and
a counterweight provided to the rear part of the vehicle surrounds lateral and rear sides of the battery or the battery pack.

12. The battery cooling structure of the hybrid industrial vehicle according to claim 10, wherein
the second cooling air flow passage is inclined with respect to a vertical direction, and
the battery or the battery pack is disposed to be inclined with respect to the vertical direction.

13. The battery cooling structure of the hybrid industrial vehicle according to claim 1, wherein
the second cooling air flow passage is provided to an upper portion of a rear part of the vehicle and is located above the first cooling air flow passage, and
a counterweight provided to the rear part of the vehicle surrounds lateral and rear sides of the battery or the battery pack.

14. The battery cooling structure of the hybrid industrial vehicle according to claim 13, wherein
an upper side of the battery or the battery pack is covered with a battery guard.

15. The battery cooling structure of the hybrid industrial vehicle according to claim 13, wherein
an upper side of the battery or the battery pack is covered with a battery cover.

16. The battery cooling structure of the hybrid industrial vehicle according to claim 1, wherein
the second cooling air flow passage is inclined with respect to a vertical direction, and
the battery or the battery pack is disposed to be inclined with respect to the vertical direction.

17. The battery cooling structure of the hybrid industrial vehicle according to claim 1, wherein
an air inlet of the second cooling air flow passage is disposed above or at a lateral side of the battery pack, and
cooling air having flowed in from the air inlet hits a housing of the battery pack, flows into the housing from one end side of the housing, and then flows out from the other end side of the housing.

18. The battery cooling structure of the hybrid industrial vehicle according to claim 1, wherein
a shielding plate is connected to the second cooling air flow passage and extends the second cooling air flow passage to an inside of the first cooling air flow passage.

19. The battery cooling structure of the hybrid industrial vehicle according to claim 1, wherein
at least one battery cooling fan for the battery or the battery pack is provided to the second cooling air flow passage.

20. The battery cooling structure of the hybrid industrial vehicle according to claim 1, wherein
a plurality of batteries in the battery pack are disposed at an upstream side and a downstream side along a flow direction of the cooling air.

\* \* \* \* \*

UNITED STATES PATENT AND TRADEMARK OFFICE
CERTIFICATE OF CORRECTION

PATENT NO. : 8,960,346 B2  Page 1 of 1
APPLICATION NO. : 13/056992
DATED : February 24, 2015
INVENTOR(S) : Kiyomitsu Ogawa It is certified that error appears in the above-identified patent and that said Letters Patent is hereby corrected as shown below:

ON THE TITLE PAGE:

At item (73), Assignee, change:

"(73) Assignee:  Mitsubishi Heavy Industries, Ltd., Tokyo (JP)"

to: --(73) Assignee:  Mitsubishi Nichiyu Forklift Co., Ltd., Nagaokakyo-shi, Kyoto (JP)--.

Signed and Sealed this
Second Day of February, 2016

Michelle K. Lee
*Director of the United States Patent and Trademark Office*